United States Patent
Pinto

(10) Patent No.: US 10,073,175 B2
(45) Date of Patent: Sep. 11, 2018

(54) METHOD AND SONAR DEVICE FOR DETERMINING THE SPEED OF MOVEMENT OF A NAVAL VEHICLE IN RELATION TO THE SEA BED

(71) Applicant: ECA ROBOTICS, La Garde (FR)

(72) Inventor: Marc Pinto, Saint-Cloud (FR)

(73) Assignee: ECA ROBOTICS, La Garde (FR)

( * ) Notice: Subject to any disclaimer, the term of this patent is extended or adjusted under 35 U.S.C. 154(b) by 349 days.

(21) Appl. No.: 14/833,357

(22) Filed: Aug. 24, 2015

(65) Prior Publication Data
US 2016/0054444 A1  Feb. 25, 2016

(30) Foreign Application Priority Data

Aug. 25, 2014  (FR) ...................................... 14 57951

(51) Int. Cl.
    *G01S 15/00* (2006.01)
    *G01S 15/60* (2006.01)
    *G01S 15/58* (2006.01)

(52) U.S. Cl.
    CPC ............ *G01S 15/60* (2013.01); *G01S 15/588* (2013.01)

(58) Field of Classification Search
    CPC .............................. G01S 15/60; G01S 15/588
    See application file for complete search history.

(56) References Cited

U.S. PATENT DOCUMENTS

| 5,089,996 A | 2/1992 | Masreliez |
| 6,240,050 B1 * | 5/2001 | Pinto ................... G01S 15/8904 367/11 |
| 2004/0165479 A1 | 8/2004 | Scoca et al. |
| 2014/0126333 A1 | 5/2014 | Lohrmann et al. |

FOREIGN PATENT DOCUMENTS

WO  89/04975  6/1989

OTHER PUBLICATIONS

French Search Report dated May 28, 2015, corresponding to the Foreign Priority Application No. 1457951.

* cited by examiner

*Primary Examiner* — Hovhannes Baghdasaryan
(74) *Attorney, Agent, or Firm* — Young & Thompson

(57) ABSTRACT

Sonar intended to be carried by a naval vehicle including at least one element for transmitting an acoustic signal, at least one element for receiving the acoustic signal transmitted and reflected on the sea bed and at least two phase centers ($PC_1$, $PC_2$) that are disposed along a first and a second axis ($v_1$, $v_2$), respectively, forming an interferometric antenna. The sonar includes elements for determining the speed of movement of the vehicle as a function of the computed value of the relative trim angle ($\beta$) formed between a straight line ($d_1$) that is perpendicular to the axes ($v_1$, $v_2$) of the phase centers and a straight line ($d_2$) that is perpendicular to the sea bed (F) and of the value determined for the angle of sight.

19 Claims, 3 Drawing Sheets

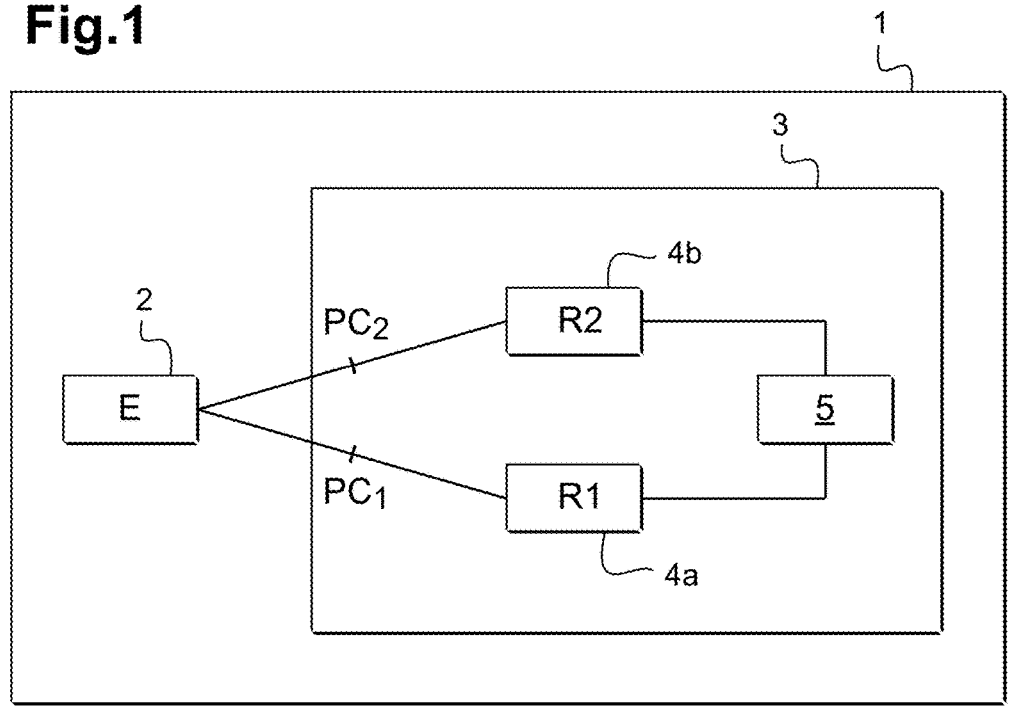
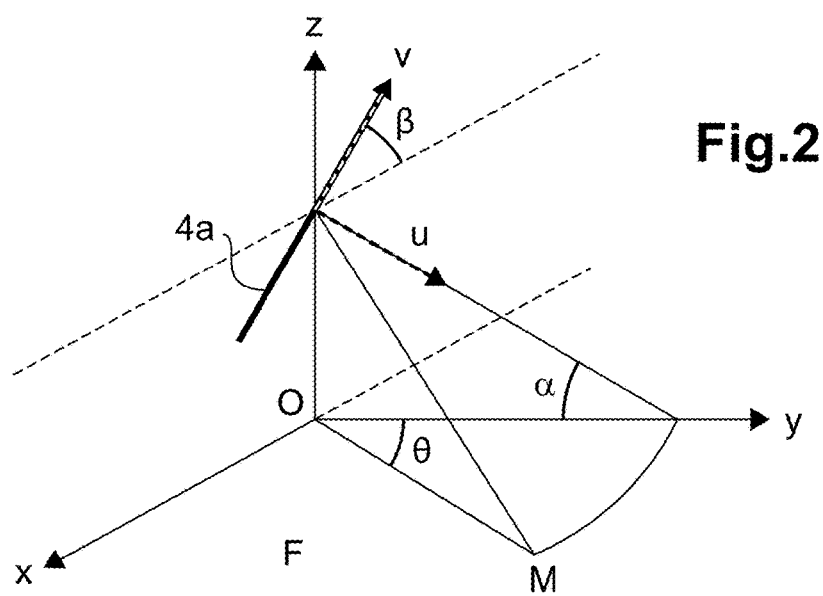

METHOD AND SONAR DEVICE FOR DETERMINING THE SPEED OF MOVEMENT OF A NAVAL VEHICLE IN RELATION TO THE SEA BED

BACKGROUND OF THE INVENTION

FIELD OF THE INVENTION

The present invention concerns the field of maritime navigation instruments allowing estimation of the speed of movement of a naval vehicle in relation to the sea bed. Such instruments are called "logs".

More particularly, the invention concerns acoustic logs allowing computation of the speed of the naval vehicle from consecutive sonar transmissions and corresponding temporal series of bed echo signals received by a network of receivers forming an antenna.

DESCRIPTION OF THE RELATED ART

Generally, an acoustic log for a naval vehicle has at least one transmitter sending a signal in a region of the sea bed and at least one receiver that is intended to receive reflected signals or back-scattered sea bed echoes. The acoustic log can likewise have one or more transducers serving as transmitting and receiving elements that allow transmission and reception of acoustic signals.

There are various types of acoustic logs:

Acoustic logs referred to as "spatial correlation" acoustic logs determine the value of the speed of the naval vehicle by comparing the echoes from the sea bed that are received on all the receivers of an antenna for two consecutive transmitted pulses. For this, for each transmitter/receiver pair, a phase centre corresponding to the intermediate geometric point between transmission and reception is defined. The pair of phase centres for which the correlation of the sea bed echoes is at a maximum is determined. This pair is then used in order to determine the speed of movement of the naval vehicle, which is dependent on the distance measured between the two phase centres of said pair that is used and on the known period between the two transmissions.

However, such a principle works well only if the speed of the vehicle is collinear with an axis of the antenna carried by the naval vehicle. In the case of a naval vehicle launched at high speed, its speed of movement is generally principally oriented along the axis of the vehicle, which generally coincides with an axis of the antenna. However, in the presence of transverse currents or in the case of a low speed of movement, the speed vector likewise has components that are perpendicular to the antenna. Measurement errors then appear in all the components of the movement and notably those in the directions parallel to the antenna, when the latter is not parallel to the sea bed but rather forms a relative trim angle therewith. This then causes projection errors that cannot be corrected because the relative trim continues to be unknown for current logs.

Current spatial correlation acoustic logs therefore do not allow precise determination of the speed of movement of the naval vehicle. This is because this precision problem derived from the fact that spatial correlation logs lack techniques for angular location of bed echoes. The bed echoes used by the log for computing the speed of the naval vehicle are not located well in terms of angle, causing projection errors and therefore a bias between the actual speed of the naval vehicle and the speed computed by the log. Such biases are particularly detrimental to the precision of navigation when the speed information for the naval vehicle is combined with an inertial unit.

Acoustic logs referred to as "Doppler-effect acoustic logs" allow estimation of the speed of the naval vehicle in relation to the surrounding environment and use measurement of the frequency shift in the back-scattered echoes from the sea bed. Current Doppler logs are referred to as "wideband Doppler logs" because they use transmissions with a wide relative passband. Such logs transmit a burst of short, or else phase-modulated or frequency-modulated, pulses and use temporal correlation in order to determine the phase difference between the bed echoes of two successive pulses. The speed of movement of the vehicle is then deduced therefrom.

The wideband Doppler-effect log can then be likened to a spatial correlation log with a single phase centre. This phase centre thus cannot be moved between two successive transmissions in order to maximize the correlation. This results in a great spread in the Doppler spectrum and therefore in considerable uncertainty for the measurement of the Doppler shift sought and hence the measurement of the speed. Current Doppler logs attempt to reduce this uncertainty by identifying the Doppler shift sought using the barycentre of the Doppler spectrum, but the measurement then becomes very sensitive to amplitude variations in the bed echoes, which are very difficult to foresee. Thus, the variations in acoustic propagation losses owing to unfamiliarity with oceanographic conditions and the variations in reflectivity from the sea bed, due to local slopes in this bed, give rise to considerable biases in the determination of the speed of movement. To reduce these biases, such logs use very fine beams, which require either high operating frequencies that cause the range to be limited or excessive dimensions that are incompatible with many naval platforms and notably small autonomous vehicles.

Current acoustic logs therefore have either precision problems or range problems for given dimensions. There is therefore a need to provide an acoustic log that allows increased precision to be obtained for determination of the speed of movement while simultaneously not limiting the range.

SUMMARY OF THE INVENTION

The aim of the present invention is to overcome the disadvantages of acoustic logs from the prior art.

The object of the invention is therefore to provide a method and a device for determining the speed of movement of a naval vehicle in relation to the sea bed which are precise and reliable without, however, limiting the range of said device and while maintaining dimensions that are compatible with existing naval platforms.

In other words, the aim of the invention is to improve current acoustic logs, notably acoustic logs referred to as spatial correlation acoustic logs and logs referred to as Doppler-effect logs, which both use the principles of spatio-temporal acoustic correlation.

The subject of the invention is thus a sonar that is intended to be carried by a naval vehicle comprising at least one device for determining the speed of movement of the naval vehicle in relation to the sea bed, of acoustic correlation log type. Said device for determining the speed of movement of the naval vehicle has at least one means for transmitting an acoustic signal, and at least one means for receiving said acoustic signal transmitted and reflected on the sea bed.

Each intermediate geometric location between the transmission point and the reception point forms a phase centre. The device for determining the speed of movement of the naval vehicle comprises means for measuring the movement of the phase centre.

The sonar comprises at least two phase centres, the first phase centre being disposed along a first axis and the second phase centre being disposed along a second axis, which is parallel to the first axis.

The device for determining the speed of movement of the naval vehicle also comprises means for determining the relative trim angle with respect to the bed formed between a straight line that is perpendicular to the axes of the phase centres and a straight line that is perpendicular to the sea bed, means for determining the angle of sight, formed between the interferometric base and the direction of arrival of the bed echoes for the distance under consideration, and means for determining the speed of movement of the vehicle as a function of said determined angles.

The invention thus proposes computation of the speed of the naval vehicle by using a combination of correlation techniques of current logs with techniques of angular location of the bed echoes obtained by using an interferometric sonar antenna. This thus allows reduction, or even elimination, of the projection errors of current acoustic correlation logs without resorting to the use of excessively fine beams. This is because none of the current acoustic logs use an interferometric antenna to improve the precision of measurement of the speed of the naval vehicle relative to the sea bed.

Advantageously, the sonar comprises a means for transmitting the acoustic signal and two means for receiving said acoustic signal transmitted and reflected on the sea bed so as to form an interferometric antenna. Each intermediate geometric location between the transmission point and each reception point thus forms a phase centre.

It will be noted that the invention is not limited to the use of one transmission means and two reception means and generally concerns any antenna having two phase centres. This is because a person skilled in the art will be able to adapt the invention to a sonar having two transmission means and at least one reception means that are placed so as to obtain the same two phase centres. It is enough for him to put the two transmission means in the same position as the previous two reception means and the reception means in the position of the previous transmission means.

Advantageously, the means for determining the relative trim angle with respect to the bed comprise means for comparing the phase centres of the two reception means for a single transmission so as to retain the pairs for which the correlation is at a maximum, means for measuring the distance between the second phase centre and the orthogonal projection of the first phase centre on the second axis, the relative trim angle with respect to the bed being dependent on said measured distance and on the known length of the interferometric base.

By way of example, the means for determining the speed of movement of the vehicle comprise means for computing a speed vector along the longitudinal axis as a function of the projected spot on the longitudinal axis for said distance between these two phase centres and of the period between the two transmissions, the projected spot on the longitudinal axis for said distance between the two phase centres being dependent on the relative trim angle with respect to the bed.

Advantageously, the means for determining the speed of movement of the vehicle comprise means for computing the projected spot for the movement on the sight axis as a function of the relative trim angle, of the angle of sight and of the length of the interferometric base.

In another embodiment, the sonar comprises a number of reception means greater than two and means for combining the pairs of phase centres in order to improve precision.

The reception means may be antennas of linear, planar, conformal or volumetric type.

The reception means may be antennas of physical or synthetic type.

The synthetic antenna may be formed by two physical antennas in interferometric configuration, for example.

In another embodiment, the sonar comprises at least two devices for determining the speed of movement of the naval vehicle in relation to the sea bed as are defined above, each device for determining the speed of movement comprising independent sight axes.

According to another aspect, the invention concerns a system comprising a sonar as defined above and an inertial unit. The inertial unit can comprise a gyroscope, for example.

According to another aspect, the invention concerns a method for determining the speed of movement of a naval vehicle in relation to the sea bed having a device for determining the speed of movement, of acoustic correlation log type, in which at least one acoustic signal is transmitted, and at least one reception means is used to receive said acoustic signal transmitted and reflected on the sea bed, the intermediate geometric location being the transmission point and the reception point forming a phase centre. The method for determining the speed of movement of the naval vehicle furthermore comprises a step of measurement of the movement of the phase centre.

In a second step, a first phase centre disposed along a first axis and a second phase centre disposed along a second axis above the first axis are determined. In a subsequent step, the relative trim angle with respect to the bed formed between a straight line that is perpendicular to the axes of the phase centres and a straight line that is perpendicular to the sea bed is determined, the angle of sight is determined, and the speed of movement of the vehicle is determined as a function of said determined angles.

In one embodiment, at least two distinct reception means are used to receive said acoustic signal transmitted by the transmission means and reflected by the sea bed, each intermediate geometric location between the transmission point and each reception point forming a phase centre.

Advantageously, in order to determine the relative trim angle with respect to the bed, the phase centres of the two reception means are compared for a single transmission and the pair of phase centres for which the correlation is at a maximum is retained, and the distance between the second phase centre and the orthogonal projection of the first phase centre on the second axis is measured.

In order to determine the speed of movement of the vehicle, it is possible to compute a speed vector along the longitudinal axis as a function of the projected spot on the longitudinal axis for said distance between the two phase centres and the period between the two transmissions, the projected spot on the longitudinal axis for said distance between the two phase centres being dependent on the relative trim angle with respect to the bed.

Advantageously, in order to determine the speed of movement of the vehicle, a speed vector is computed along the sight axis as a function of the projected spot for the movement on the sight axis, the projected spot for the movement on the sight axis being dependent on the relative trim angle with respect to the bed, on the angle of sight and on the known length of the interferometric base.

BRIEF DESCRIPTION OF THE DRAWING FIGURES

Other aims, features and advantages of the invention will emerge upon reading the description that follows, which is provided solely by way of nonlimiting example and written with reference to the appended drawings, in which:

FIG. 1 is a highly schematic view of a sonar system according to an embodiment of the invention;

FIG. 2 shows the position of the linear antenna of the sonar system shown in FIG. 1 in relation to the sea bed;

DETAILED DESCRIPTION OF THE INVENTION

Figure 3:
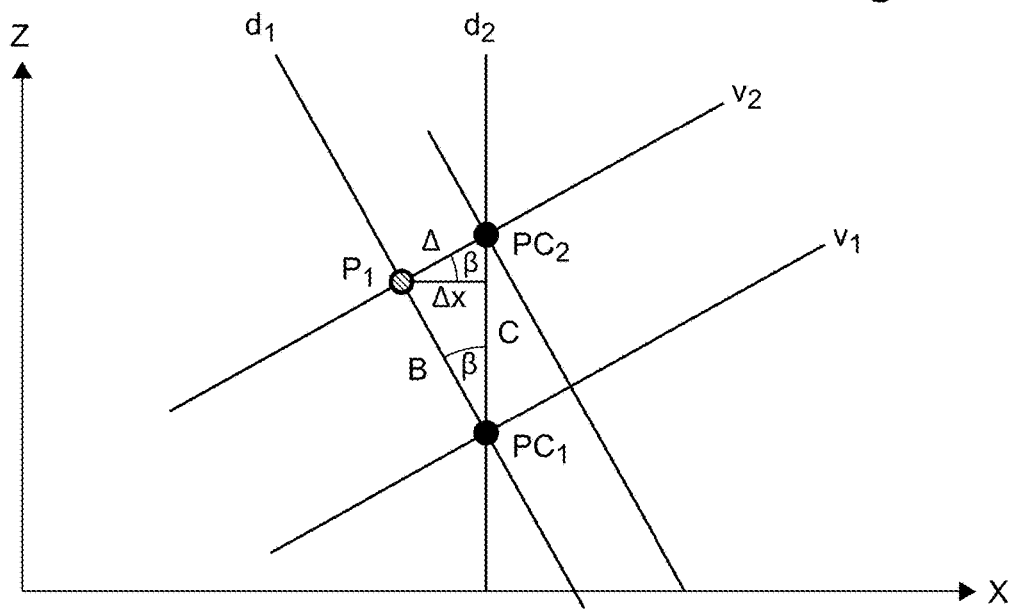
FIG. 3 shows the phase centres of each reception means from FIG. 1 in the XZ plane, along a first axis and a second axis, respectively.
Figure 4:
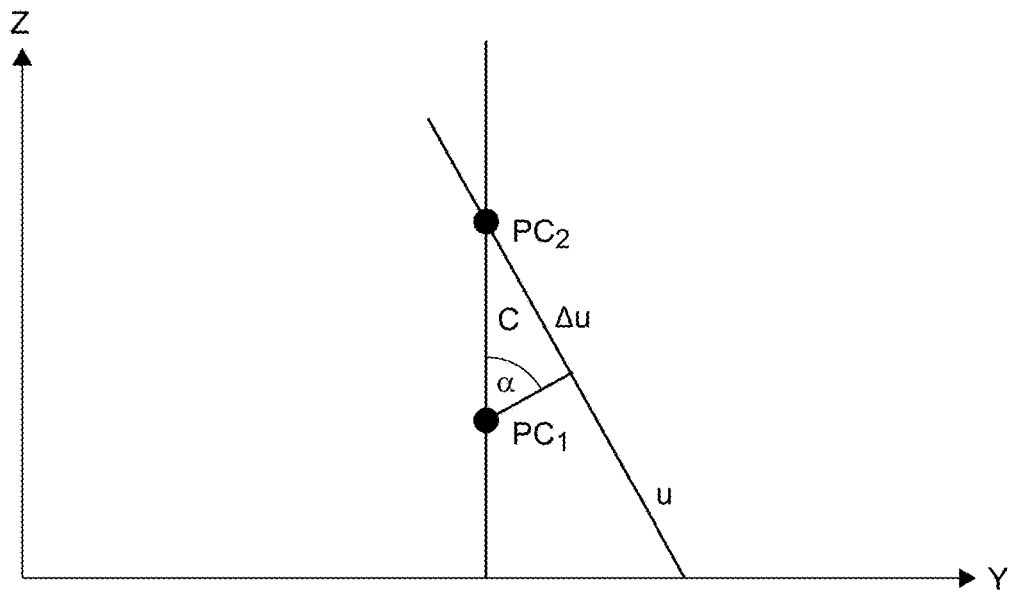
FIG. 4 shows the phase centres of each reception means from FIG. 1 in the YZ plane.

In the remainder of the description, the terms "longitudinal", "transverse", "front", "rear", "left" and "right" are understood in relation to the usual orthogonal reference of naval vehicles, which is shown in FIG. 1, and comprising:
- a longitudinal axis X, in the plane of the sea bed and directed from the rear to the front of the vehicle;
- a transverse axis Y, likewise in the plane of the sea bed, perpendicular to the X axis and directed from right to left of the forward-moving vehicle;
- a Z axis, orthogonal to the X and Y axes and perpendicular to the plane of the sea bed.

As illustrated highly schematically in FIG. 1, a sonar system, referenced 1 as a whole, is intended to be carried by a naval vehicle (not shown), such as a submarine or surface vehicle. The sonar system 1 comprises, at a transmission point E, a means 2 for transmitting an acoustic signal and a device 3 for determining the speed of movement of the naval vehicle in relation to the sea bed comprising a data processing device 5.

The device 3 for determining the speed of movement of the naval vehicle in relation to the sea bed is of acoustic correlation log type and has two means 4a, 4b for receiving the acoustic signal transmitted by the transmission means 2 and reflected on the sea bed.

By way of example, the reception means 4a, 4b are sensors that are disposed on a network antenna so that the second reception means 4b is obtained by a fictitious translation of the first reception means 4a perpendicular to its axis so as to form an interferometer. By way of example, the reception means 4a, 4b are disposed one above the other along the Z axis (FIG. 2).

For each transmitter/receiver pair 2/4a and 2/4b, a phase centre $PC_1$, $PC_2$ corresponding to the intermediate geometric point between the transmission point E for the acoustic signal and each reception point $R_1$, $R_2$ is defined.

The data received by the two reception means 4a, 4b are then sent and processed by the data processing device 5 so as to compute the speed of movement of the naval vehicle.

It will be noted that the transmission means may be disposed directly on the network antenna or at another location of the naval vehicle.

FIG. 2 shows the position of the sonar system 1 carried by the naval vehicle in relation to the sea bed F. For the sake of clarity, it will be noted that only the first reception means 4a has been shown in FIG. 2. It will be assumed in this case, without implying limitation, that the first reception means 4a is carried by a linear network antenna.

As illustrated in FIG. 2, the sea bed referenced F as a whole, which is assumed to be flat for the distances under consideration, is located in the plane XY formed by the longitudinal X and tranversal Y axes.

When the transmission means 2 transmits, at the transmission point E, an acoustic signal in the direction of sight u, corresponding to a direction perpendicular to the axis of the network antenna 4a and directed towards the sea bed F, the signal is reflected by diffusers M situated on the sea bed F. Each straight line OM from each diffuser M forms an angle θ with the transverse axis Y. The echo from the sea bed corresponds to the result of the interference from all the diffusers M.

The first reception means 4a of the network antenna is located in the plane XZ, formed by longitudinal X and vertical Z axes, and forms an angle β, called relative trim with respect to the sea bed, with the plane XY of the sea bed F. In other words, the relative trim angle β corresponds to the angle formed between a first straight line $d_1$ (which can be seen in FIG. 3) that is perpendicular to the axis v of the reception means 4a, 4b and a second straight line $d_2$ (which can be seen in FIG. 3) that is perpendicular to the sea bed F.

The angle formed between the axis of the direction of sight u and the transverse axis Y is called the angle of sight α.

FIG. 3 shows the respective phase centres $PC_1$, $PC_2$ of each reception means 4a, 4b, along a first axis $v_1$ and a second axis $v_2$, respectively. The two axes $v_1$ and $v_2$ are parallel to one another so that the two phase centres $PC_1$, $PC_2$ are situated one above the other along an axis that is Z in the particular case shown but that could be any other direction in the plane perpendicular to the common axis of the two reception means.

The second phase centre $PC_2$ can be considered to be the result of movement of the first phase centre $PC_1$ by a fictitious translation along a known vector, which is oriented perpendicularly to the axis $v_1$ of the first reception means 4a and of known length B.

The two reception means 4a, 4b for the signals can be considered to form an interferometric antenna.

A fictitious movement Δ of the first phase centre $PC_1$ of the first reception means 4a leads to a phase shift, for each diffuser M, that is equal to the projection of this movement in the direction of each diffuser.

The movement Δ corresponds to the projections on the X, Y and Z axes. Thus, for a movement Δx along the X axis, the following phase shift is obtained:

$$\Phi x = 2k\Delta x \cos\alpha \sin\theta \quad \text{(Equation 1)}$$

For a movement Δy along the Y axis, the following phase shift is obtained:

$$\Phi y = 2k\Delta y \cos\alpha \quad \text{(Equation 2)}$$

For a movement Δz along the Z axis, the following phase shift is obtained:

$$\Phi z = -2k\Delta z \sin\alpha \quad \text{(Equation 3)}$$

where k is the wave number.

Only the phase shift along the X axis is dependent on the angle θ.

Since the phase centres $PC_1$, $PC_2$ between two pulses can move only parallel to the reception means, it is therefore necessary to know the relative trim β in order to compute the movement along the X axis and hence the phase shift therefor:

$$\Delta x = \Delta \cos \beta \quad \text{(Equation 4)}$$

where the movement Δ is measured by means that are known and that will not be described in more detail.

The phase shift Φ provided by the pair of phase centres for the intercorrelation peak of the echoes from this pair allows determination of the projected movement Δu along the sight axis u by the following equation:

$$\Delta u = \frac{\Phi}{2k} \quad \text{(Equation 5)}$$

The angle of sight α is therefore itself necessary for interpreting the result of the temporal correlation.

It will be noted that in current acoustic correlation logs the projection of the movement Δx of the phase centres along the X axis is not computed, so that when the antenna is not parallel to the sea bed the speed of movement determined by such logs is erroneous. Knowing that the relative trim β can reach larger or smaller values, with a trim β of 10°, the value of the projected speed along the X axis is ascribed an error of greater than 1.5%.

In point of fact, by construction, the distance B between the first phase centre $PC_1$ and the projected spot $P_1$ therefor on the second axis $v_2$ is known. In the description that follows, B is considered to be the length of the interferometric base. This is because, as indicated previously, the second reception means 4b and therefore the phase centre $PC_2$ thereof are considered to be the result of movement of the first reception means 4a and therefore the phase centre $PC_1$ thereof by a fictitious translation along a known vector, which is oriented perpendicularly to the first axis $v_1$ and of known length B for the interferometric base.

Thus, by virtue of projection on the longitudinal axis X of the fictitious movement of the phase centres $PC_1$, $PC_2$, the following equation is obtained:

$$\Delta x = B \sin \beta \quad \text{(Equation 6)}$$

By definition, the projection Δx along the longitudinal axis X of the fictitious movement of the phase centres $PC_1$, $PC_2$ being equal, the relative trim angle β is deduced therefrom:

$$\beta = \tan^{-1}\left(\frac{\Delta}{B}\right) \quad \text{(Equation 7)}$$

Once the relative trim β has been computed, it is possible to determine the value of the projection Δx along the longitudinal axis X of the movement Δ of the phase centres $PC_1$, $PC_2$. It will be noted that the movement Δ likewise corresponds to the distance between the second phase centre $PC_2$ and the orthogonal projection $P_1$ of the first phase centre $PC_1$ on the second axis $v_2$.

The precision of the determination of the relative trim is proportional to the precision of the measurement of the movement Δ and inversely proportional to the length B. Moreover, the measurement of the movement Δ is even more precise when the transmission beam is extended angularly. Taking a beam of 25°, for example, the precision of the movement Δ is of the order of $$\frac{\lambda}{20}$$

and the precision of the distance B is of the order of 10λ, so that a precision for the relative trim of the order of $$\frac{1}{200}$$

rad, or 0.25°, is obtained.

Figure 5:
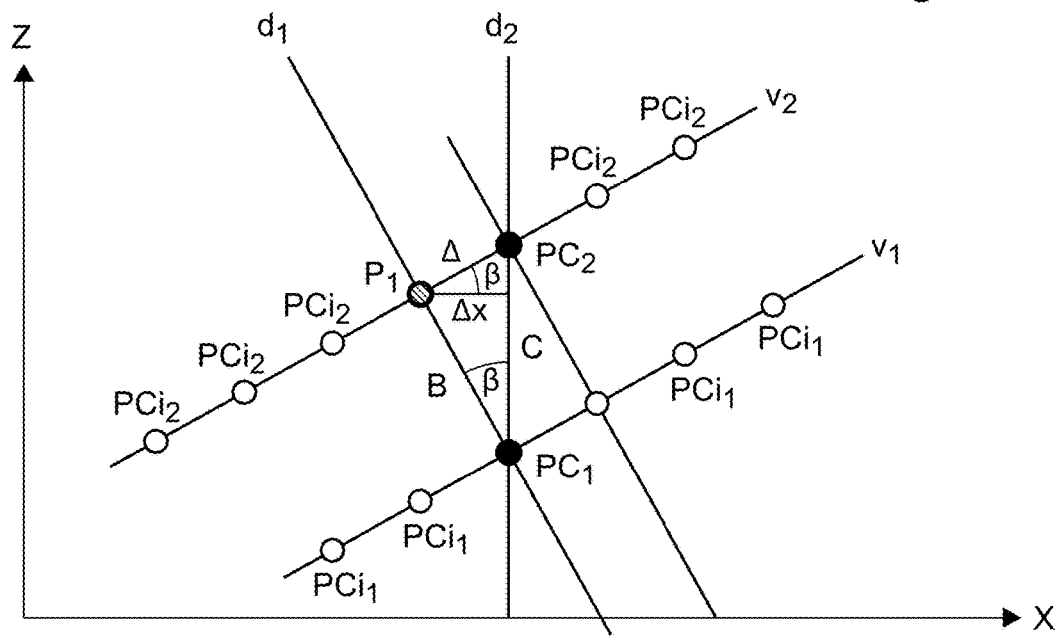
FIG. 5 shows the phase centres of the reception means, each comprising a plurality of receivers.

As a variant, it would be foreseeable for each reception means 4a, 4b to comprise a number of phase centres PC greater than one, as can be seen in FIG. 5, or for the number of phase centres of one of the reception means to be different from the number of phase centres of the other reception means.

Once the relative trim β has been determined by equation 7, it is possible to determine the angle of sight α in accordance with the following equation:

$$\sin \alpha = \frac{\Delta u}{C} = \Delta u \frac{\cos \beta}{B} \quad \text{(Equation 8)}$$

The precision of the angle of sight α is of the order of $$\frac{1}{100}$$

rad, or 0.5°.

It is therefore possible to compute the component of the speed $V_x$ along the X axis as a function of the projected spot on the X axis for the movement Δx between two phase centres $PC_1$, $PC_2$ over a period Δt between the transmission of the wave and the reception thereof in accordance with the following equation:

$$Vx = \frac{\Delta x}{\Delta t} \quad \text{(Equation 9)}$$

FIG. 5 shows the phase centres $PCi_1$, $PCi_2$ of each reception means 4a, 4b, each comprising a plurality of receivers and therefore each defining a plurality of phase centres PCi. In this case, the method of acoustic correlation logs is applied to moved phase centres referred to as "DPCA" so as to compare the sea bed echoes from all the pairs of phase centres and to use the pair of phase centres for which the correlation of the sea bed echoes is at a maximum so as to determine the speed of movement of the naval vehicle.

Once the pair of phase centres has been selected, the two angles β and α are determined in identical fashion to that described previously.

It is possible to repeat these operations for numerous pairs of phase centres in order to further increase the precision of the relative trim β and the precision of the angle of sight α.

By way of example, by taking twenty-five pairs of phase centres, it is possible to reduce the precision to 0.1°.

By way of nonlimiting example, the reception means can each comprise a linear antenna. An interferometric antenna is thus obtained that is formed by two linear antennas that are parallel to one another. Each linear antenna comprises at least one phase centre PC so as to determine the two angles $\beta$ and $\alpha$ in accordance with the method described previously. As a variant, it will be possible to dispose a number of linear antennas greater than two.

In another embodiment, which is not shown, it will be possible to use at least one additional antenna that is perpendicular to the two parallel reception means. By way of nonlimiting example, it is possible to form an additional antenna perpendicular to the two reception means by using a number of reception means greater than two and each of the reception means having a phase centre.

In another embodiment, which is not shown, it will be possible to use a particular transmission mode so as to increase the performance thereof. To this end, at least two transmitters are used that are situated at the two ends of an antenna, thus allowing synthetization of a movement of the transmitter between two transmissions. This transmission mode allows an increase in the number of pairs of phase centres used and thus in the precision of the log. It is also possible to synthetize different speeds of movement by using different pairs of transmissions in separate spectral bands and by varying the movement and the period between the two transmissions from one band to the other.

In another variant of the invention, the measuring device could comprise two planar antennas with superimposed phase centres, one antenna referred to as upper and one antenna referred to as lower.

In another variant of the invention, determination of the measurement of the relative trim involves determination of the two angles, referred to as trim angle and relative heel angle, that are formed between a first straight line perpendicular to the common plane of the reception means and a second straight line perpendicular to the sea bed F. These two angles are determined from the two distances, which are measured in two perpendicular directions of the plane that is common to the two antennas, between the second phase centre and the orthogonal projection on the second antenna of the first phase centre. In this variant, it may be necessary to move the reception means of the two planar antennas so as to avoid masking of one antenna by the other. So that the phase centres remain superimposed, it may also be necessary to synthetize a movement in the opposite direction from the transmission, using two transmitters that are remote from the desired movement as described previously.

As a variant, it would likewise be possible to dispose two measuring devices 3 as described previously, for example one on the port side of the naval vehicle and the other on the starboard side, so as to have independent directions of sight u and to increase the precision of determination of the speed of movement.

It would likewise be possible to dispose an additional, front-sighted measuring device. The speed of movement can then be integrated into a navigation filter with other measurements, including an inertial unit, for example. "Inertial unit" is the name given to any piece of equipment onboard a naval vehicle comprising acceleration and rotation sensors and a data processing system allowing real-time determination of the position of the vehicle, the orientation thereof and the components of the speed of movement of the vehicle. By way of example, the inertial unit can comprise a gyroscope for determining the angular position of the naval vehicle.

In another embodiment, which is not shown, it would be possible to use at least two synthetic interferometric antennas, each formed from two superimposed physical linear antennas. A first synthetic antenna can be disposed on the port side and the second synthetic antenna can be disposed on the starboard side of the naval vehicle. It is thus possible to measure the movement of the naval vehicle between two consecutive passes on the same bed area and therefore to calibrate these passes very precisely, for example in order to detect changes between the passes. "Synthetic antenna" is understood to mean any system comprising at least one physical antenna equipped with N receivers and a signal processing system in which the signals received by the physical antenna at successive instants and thus at successive locations are used to obtain a resolution equivalent to that of a virtual antenna corresponding to the length covered by the physical antenna during these different instants. In other words, a virtual antenna is formed from the various spatial positions of a physical antenna. When the nominal movement of the carrier is collinear with the physical antenna, a synthetic linear antenna is obtained.

Figure 6:
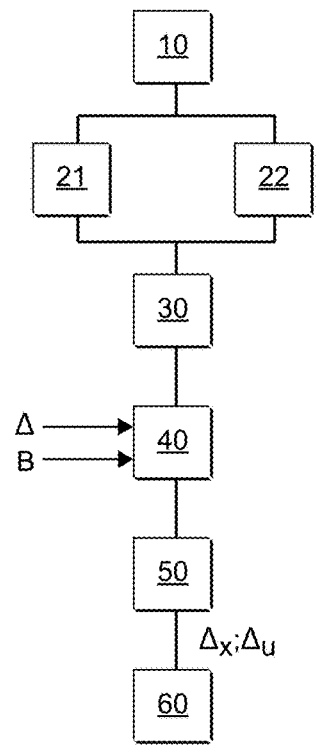
FIG. 6 shows a flowchart for a method for determining the speed of movement of the naval vehicle.

The flowchart shown in FIG. 6 illustrates an example of a method implemented by the data processing device 5 in order to compute the speed of movement of the naval vehicle.

Following a step 10 of transmission of an acoustic signal by the transmission means 2, the echo of the signal reflected on the sea bed F is received at two reception points R1, R2, in steps 21 and 22, respectively.

In step 30, the phase centre $PC_1$, $PC_2$ between each transmitter/receiver pair is defined. In the case, by way of example, of a linear antenna comprising a plurality of reception means, the pair of phase centres for which the correlation of the sea bed echoes is at a maximum is determined by comparing the sea bed echoes from all the pairs of phase centres.

In step 40, the relative trim $\beta$ is computed as a function of the known distance B between the first phase centre $PC_1$ and the projected spot $P_1$ therefor on the second axis $v_2$ and as a function of the movement $\Delta$ measured using the acoustic correlation method in accordance with equations 4 and 6 above:

$$\Delta x = \Delta \cos\beta = B\sin\beta \Rightarrow \beta = \tan^{-1}\left(\frac{\Delta}{B}\right)$$

Once the relative trim $\beta$ has been computed, it is possible to determine, in step 50, the value of the projection $\Delta x$ along the longitudinal axis X of the movement $\Delta$ of the phase centres $PC_1$, $PC_2$ and the value of the projection $\Delta u$ along the sight axis u of the movement $\Delta$ of the phase centres $PC_1$, $PC_2$ as a function of the angle of sight $\alpha$ computed using equation 8.

In step 60, the value of the components of the speed Vx and Vu along the longitudinal axis X and the sight axis u, respectively, is then deduced therefrom:

$$Vx = \frac{\Delta x}{\Delta t} \qquad \text{(Equation 9)}$$

$$Vu = \frac{\Delta u}{\Delta t} \qquad \text{(Equation 10)}$$

The device and the method described allow unbiased determination of the value of two components of the speed of movement of the naval vehicle, namely the speed $V_u$ along the sight axis u defined by the projection Δu along the sight axis u of movement Δ and the speed $V_x$ along the longitudinal axis X defined by the projection Δx along the longitudinal axis X of the movement Δ.

An improved acoustic correlation log is thus obtained by virtue of the integration of an interferometric function allowing local determination of the angles of orientation of the network antenna in relation to the bed and the angle of sight, and deduction of the speed of movement of the vehicle in relation to the sea bed therefrom. This eliminates the projection errors in the speed vector that are the main source of bias in current logs.

The reason is that the very precise angular location permitted by the device for determining the speed according to the invention allows the projection errors of current acoustic correlation logs to be reduced or even eliminated without resorting to the use of excessively fine beams. The invention allows a considerable improvement in the precision and range of current acoustic correlation logs.

The invention claimed is:

1. A sonar configured to be carried by a naval vehicle comprising:
at least one device for determining the speed of movement of the naval vehicle in relation to the sea bed, of acoustic correlation log, the at least one device having:
at least one transmitter transmitting, at a transmission point, an acoustic signal, and at least two receivers receiving, at reception points, said acoustic signal transmitted and reflected on the sea bed,
or
at least two transmitters transmitting, at transmission points, an acoustic signal and at least one receiver receiving, at a reception point, said acoustic signal transmitted and reflected on the sea bed,
wherein at least one receptor is located in a plane XZ formed by longitudinal X and vertical Z axes and forms a trim angle beta with respect to a plane XY of the sea bed, and
wherein at least a first phase centre and a second phase centre are formed, each phase centre being an intermediate geometric location between a transmission point and a reception point, the first phase centre being disposed along a first axis and the second phase centre being disposed along a second axis, which is parallel to the first axis, the axes being in the plane XZ with the trim angle beta,
the device for determining the speed of movement of the naval vehicle measures movement of the phase centre, a device determining a trim angle relative to the bed formed between a straight line that is perpendicular to the axes of the phase centres and a straight line that is perpendicular to the sea bed,
a device determining an angle of sight, and
a device determining the speed of movement of the vehicle as a function of said determined angles.

2. The sonar according to claim 1, comprising one said transmitter transmitting the acoustic signal and two said receivers receiving said acoustic signal transmitted and reflected on the sea bed, each intermediate geometric location between the transmission point and each reception point forming a phase centre of the phase centres.

3. The sonar according to claim 2, in which the device determining the trim angle relative to the bed comprises a device comparing phase centres of the two receptors for a single transmission and a selector selecting the pair of phase centres for which the correlation is at a maximum, a measurement device measuring a distance between the second phase centre and an orthogonal projection of the first phase centre on the second axis, the trim angle relative to the bed being dependent on said distance and on a length of an interferometric base.

4. The sonar according to claim 3, in which the device determining the speed of movement of the vehicle comprises a device computing a speed vector along the longitudinal axis as a function of a projected spot on the longitudinal axis for said distance between the phase centres and a period between two transmissions, the projected spot on the longitudinal axis for the distance between the two phase centres being dependent on the relative trim angle.

5. The sonar according to claim 4, in which the device determining the speed of movement of the vehicle comprises a device computing the projected spot for the movement on a sight axis as a function of the relative trim angle, of the angle of sight and of the length of the interferometric base.

6. The sonar according to claim 1, comprising a number of receptors greater than two a device combining the pairs of phase centres.

7. The sonar according to claim 1, in which the receptors are antennas that are linear, planar, conformal or volumetric.

8. The sonar according to claim 7, in which the receptors comprise two planar antennas having superimposed phase centres.

9. The sonar according to claim 1, in which the receptors are physical antennas.

10. The sonar according to claim 1, in which the receptors are synthetic antennas.

11. The sonar according to claim 10, in which the synthetic antennas are formed by two physical antennas in interferometric configuration.

12. The sonar according to claim 1 comprising at least two devices for determining the speed of movement of the naval vehicle in relation to the sea bed, each device for determining the speed of movement comprising independent sight axes.

13. A system comprising a sonar according to claim 1 and an inertial unit.

14. A method for determining the speed of movement of a naval vehicle in relation to the sea bed in a sonar having a device for determining the speed of movement, of acoustic correlation log, comprising:
transmitting by at least one transmitter, at a transmission point, an acoustic signal, and receiving by at least two receivers, receiving at reception points, said acoustic signal transmitted and reflected on the sea bed,
or
transmitting by at least two transmitters transmitting, at transmission points, an acoustic signal and receiving, by at least one receiver receiving, at a reception point, said acoustic signal transmitted and reflected on the sea bed,
wherein at least one receptor is located in a plane XZ formed by longitudinal X and vertical Z axes and forms a trim angle beta with respect to a plane XY of the sea bed, and
wherein at least a first phase centre and a second phase centre are formed, each plane centre being and intermediate geometric location between a transmission point and a reception point, the phase centre being disposed along a first axis and the second phase centre being disposed along a second axis, which is parallel to the first axis, the axes being in the plane XZ with the trim angle beta, the method for determining the speed of movement of the naval vehicle comprising:

measuring the movement of the phase centre, determining a trim angle formed between a straight line that is perpendicular to the axes of the phase centres and a straight line that is perpendicular to the sea bed, determining an angle of sight formed between a direction perpendicular to the axis of the receptor and directed towards the sea bed and a transverse axis Y, and determining the speed of movement of the vehicle as a function of said determined angles.

15. The method according to claim 14, in which at least two distinct receivers are used to receive said acoustic signal transmitted by the transmitter and reflected by the sea bed, each intermediate geometric location between the transmission point and each reception point forming a phase centre.

16. The method according to claim 15, in which, in order to determine a relative trim angle with respect to the bed, phase centres of the two receivers are compared for a single transmission and the pair of phase centres for which the correlation is at a maximum is retained, and the distance between the second phase centre and an orthogonal projection of the first phase centre on the second axis and the length of an interferometric base are measured.

17. The method according to claim 15, in which, in order to determine the speed of movement of the vehicle, a speed vector along the horizontal axis is computed as a function of the projected spot on the longitudinal axis for said distance between the two phase centres and the period between two transmissions, the projected spot on the longitudinal axis for said distance between the two phase centres being dependent on a relative trim angle.

18. The method according to claim 17, in which, in order to determine the speed of movement of the vehicle, a speed vector along the sight axis is computed as a function of the projected spot for the movement on the sight axis, the projected spot for the movement on the sight axis being dependent on the relative trim angle, on the angle of sight and on the length of the interferometric base.

19. The method according to claim 16, in which, in order to determine the speed of movement of the vehicle, a speed vector along the horizontal axis is computed as a function of the projected spot on the longitudinal axis for said distance between the two phase centres and the period between two transmissions, the projected spot on the longitudinal axis for said distance between the two phase centres being dependent on the relative trim angle.

* * * * *